April 7, 1959   C. N. SUGDEN   2,880,692
INSTRUMENT DIAL

Filed Jan. 11, 1956   2 Sheets-Sheet 1

Inventor
Clifford N. Sugden
by Roberts, Cushman & Grover
Att'ys

April 7, 1959  C. N. SUGDEN  2,880,692
INSTRUMENT DIAL

Filed Jan. 11, 1956  2 Sheets-Sheet 2

Inventor
Clifford N. Sugden
by Roberts, Cushman & Grover
Att'ys 2,880,692
Patented Apr. 7, 1959

2,880,692

INSTRUMENT DIAL

Clifford N. Sugden, Trumbull, Conn., assignor to Manning, Maxwell & Moore, Incorporated, Stratford, Conn., a corporation of New Jersey Application January 11, 1956, Serial No. 558,473

1 Claim. (Cl. 116—129)

This invention pertains to dial instruments, for instance pressure gauges and more especially to a novel dial useful particularly in laboratory instruments such as are employed in calibrating or checking other instruments. For such use it is often required that accuracy in reading of the reference instrument be within a certain specified tolerance, for instance within a certain percentage of the total range of the instrument. In such laboratory or reference instruments it is usual to provide the dial with fine graduations to facilitate accuracy in reading, for instance, the graduations may be spaced one degree apart, but in the reading of the instrument the amount of deviation of the pointer from any given graduation must ordinarily be determined solely by visual interpolation, which is always subject to error.

The present invention has for an object the provision of a dial, particularly for use in a reference instrument, and instruments to be calibrated thereby, which is provided with means cooperable with the pointer of the instrument to show when any deviation of the pointer from coincidence with a selected graduation lies within the range of tolerance. A further object is to provide a graduated dial with means operative to emphasize certain recurring graduations thereby to facilitate reading of the instrument from a distance. Other and further objects and advantages of the invention will be pointed out in the following more detailed description and by reference to the accompanying drawings, wherein:

Figure 1:
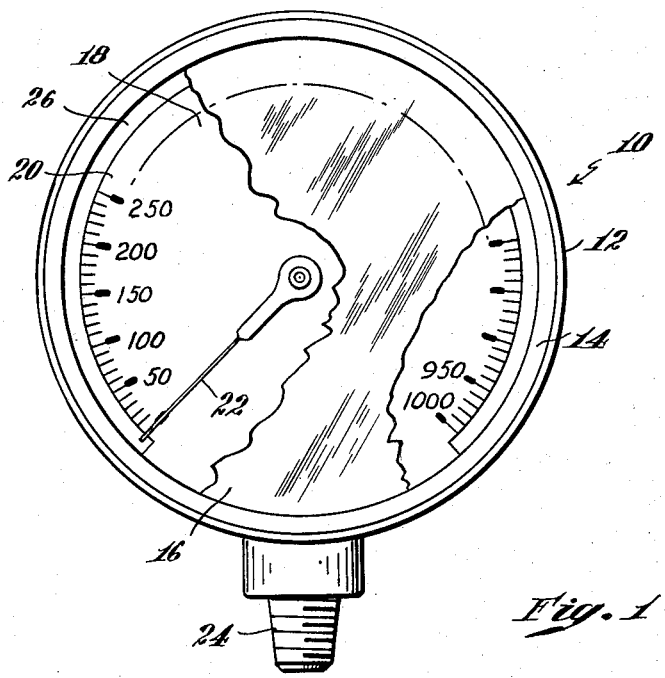
Fig. 1 is a front elevation of a dial instrument comprising a dial embodying the present invention.

Referring to the drawings there is shown a pressure gauge instrument 10 having a conventional hollow case 12, at the front of which is a bezel ring 14 holding a transparent face 16 in place, through which may be seen a dial 18 mounted within the case which has peripherally thereof a graduated scale 20 having uniformly spaced graduations 21. A pointer 22 mounted in the case in front of the dial is adapted to travel along the scale by any suitable pressure or temperature responsive mechanism. The case has a threaded ferrule 24 for attaching it to the source of pressure or heat to be measured. As clearly shown in Figs. 2 and 4, that portion of the pointer 22 which sweeps across the scale is narrow transversely, and relatively very long, having rectilinear left and right-hand edges 22a and 22b, respectively, which are parallel.

Figure 6:
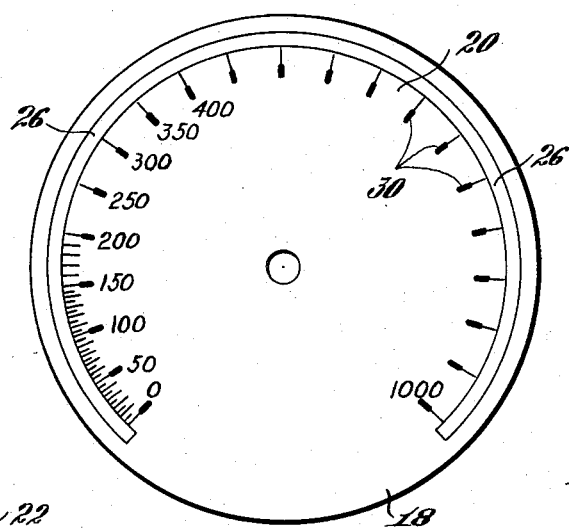
Fig. 6 is an elevation of the dial of the present invention, removed from the instrument case.

The dial removed from the gauge case as shown in Fig. 6 is a thin flat sheet metal disk, through the center of which is a hole for the pointer spindle. The front face of the dial is for the most part coated with a suitable paint, lacquer or the like. Near the perimeter but spaced inwardly therefrom the coating may be omitted to provide an annular mirror-like surface 26 to provide a sharp line of delineation for the scale. The graduated scale 20 lies along the inner edge of the mirror on the painted surface, extends through an arc of 270° and is divided into 20 major divisions, numbered from 0 to 1,000 in unit steps of 50. Each unit step of 50 may be again divided into 5 parts, and each of these parts may in turn be divided once more into 2 parts. The number of major and minor graduations and the arc length however are not intended to be limiting as these will vary with the purpose and use for which the instrument is to be designed.

Figure 3:
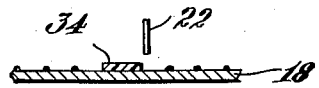
Fig. 3 is a transverse section through the dial substantially on the line 3—3 of Fig. 2.
Figure 3A:
Fig. 3a is a similar view on the line 3a—3a of Fig. 2, but illustrating a modification.
Figures 2, 5:
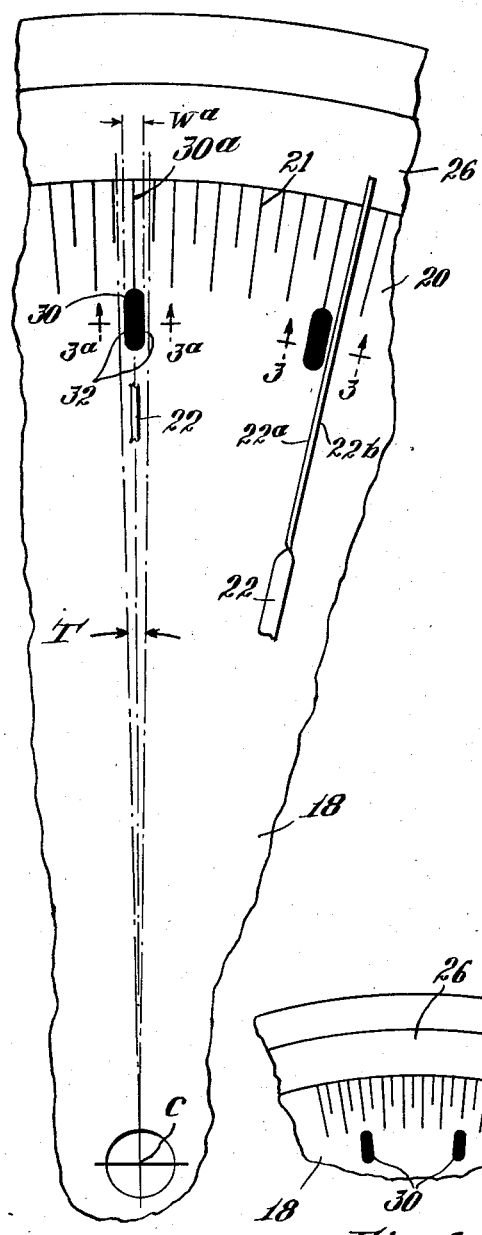
Fig. 2 is a fragmentary large scale diagrammatic view, showing how the indicating means of the present invention cooperates with the dial graduations and the pointer, a fragment of which is also shown in making certain that the dial reading is within the permissive tolerance.
Fig. 5 is a fragmentary view similar to Fig. 2, but showing the indicating elements located somewhat differently as respects the ordinary graduations.
Figure 4:
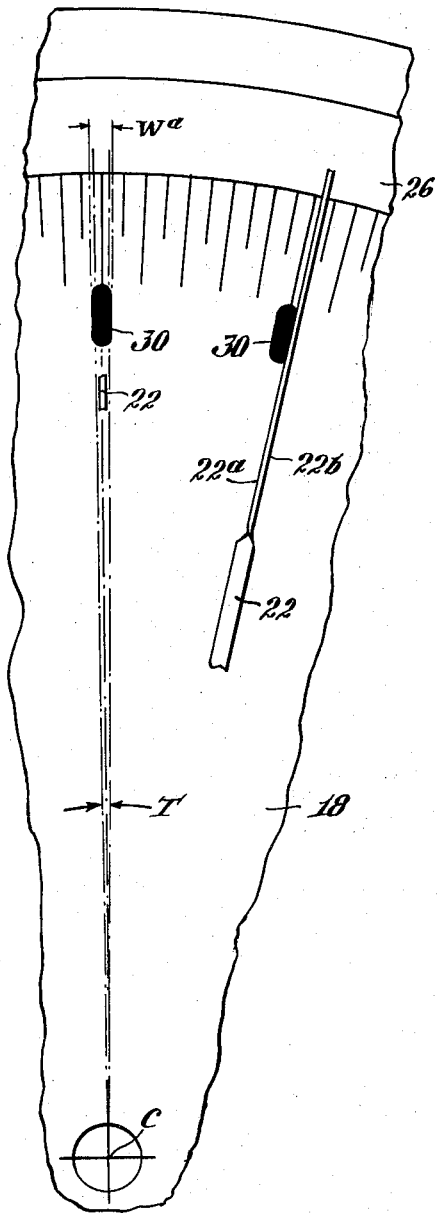
Fig. 4 is a view similar to Fig. 2, but illustrating indicating means of slightly modified form.

Preferably the major unit division lines are longer than the minor unit division lines, extending radially inward therefrom, sufficiently to be definitive of the major units. To further augment the distinctiveness of these major division lines each as shown in Figs. 2 and 6 is provided at its inner end with an unmistakable accented graduation or indicator block 30, each substantially wider than any division line of the scale. In shape these blocks or accented graduations or indicating elements are elongate radially of the disk and have radial rectilinear edges 32—32 converging toward the center C of the dial, but not necessarily through it, and smoothly rounded ends (Figs. 2 and 4). The graduations and blocks are made by conventional lithographic or screen printing methods. As illustrated, the individual graduations are very thin and narrow circumferentially of the dial and preferably merely fine radial lines, thus insuring accuracy of reading in cooperation with the very narrow end portion of the pointer. As clearly indicated in the drawings, the blocks 30 are so located, with reference to the pointer, that the edges 22a and 22b of the pointer sweep across the blocks as the free end of the pointer moves along the graduations, the blocks being located inwardly of the circle defined by the inner ends of the longest graduation. Alternatively, if desired, as shown in Fig. 3a, the major and minor division lines may be formed by making very narrow slots 36 through the dial and filling the slots with a definitive substance, for example, lithographic ink or the like in suitable fashion. The chief advantage of this latter construction would be in the attainment of a flat surface so that the parallax would be reduced to a minimum.

Referring to Fig. 2, there is shown in the greatly enlarged fragmentary portion of the dial two such indicator blocks 30, the primary purpose of which is to show whether the indicator pointer 22 is within or without the allowable tolerance selected for the instrument. For the purpose of assisting in determining whether the instrument being tested is within the tolerance desired at a specific value denoted by the graduated line 30a passing through the center of the block the instrument is designed, as shown in Fig. 2, so that if the left-hand edge 22a of the pointer 22 coincides with the right-hand edge 32 of the block 30 the instrument being tested is within the allowable tolerance at the plus side; however if the left-hand edge of the pointer is beyond the right-hand edge of the block in a clockwise direction the instrument being tested is not within the allowable tolerance. Correspondingly, if the right-hand edge 22b coincides with the left-hand edge 32 of the block the instrument is within the allowable tolerance at the minus side but if it is beyond it in a counterclockwise direction the instrument is not within the allowable tolerance. In other words, some part of the pointer, which may be only one edge, must coincide with the block.

The allowable tolerance is arbitrarily selected in accordance with the accuracy desired and for the purpose of the instrument herein illustrated to be not greater than ¼ of 1%. From this the angular width of the blocks 30 may be calculated by the formulas $T=2 \times P \times A$, and $Wa=T-2w$. In these formulas T is the tolerance angle referred to the center on which the pointer turns, P is the percent tolerance (accuracy), A is the total dial arc in angular degrees, $Wa$ is the arcuate width of the block 30 and $w$ is one-half the arcuate width of the pointer, as measured between those portions of the edges 22a and 22b which sweep across the blocks. Using the values $$\frac{0.01}{4}$$

and 270° for P and A, T is found to have the value of 1.35°. It follows therefore that $Wa$ the arcuate width of the block will be $1.35-2w$.

Alternatively the block width may be increased by the arcuate width of the pointer (defined as above), as shown in Fig. 4, so that when the right-hand edge 22b of the pointer coincides with the right edge of the block the tolerance is not exceeded but if this edge lies beyond the right-hand edge of the block in a clockwise direction the tolerance is exceeded and vice versa. In other words, all of the pointers thickness must coincide with the block. The same formulas may be employed by taking into consideration the width of the pointer thus $T=2 \times P \times A$ and $Wa=Ta+2w$.

It is, of course, not imperative that the blocks be placed opposite the longer division lines, for example, they may, as shown in Fig. 5, be placed opposite certain of the intermediate division lines. It is intended to be within the scope of the invention to place the blocks in whatever position is most expedient for the particular use for which the instrument is to be manufactured. Moreover, the arbitrary tolerance selected herein is not intended to be restrictive since instruments for different purposes may require greater accuracy or not as great accuracy and hence any desired tolerance may be built into the instrument as previously explained by substituting a greater or lesser amount for the allowable tolerance in the formulas. Still further it is contemplated that markings of one or more allowable tolerance may be employed in the same instrument.

The indicator blocks not only serve to quickly show when the master instrument and/or an instrument under comparison is within or not within the tolerance allowed but also enables the user to determine at a glance with much greater accuracy and at a greater distance the position of the pointer along the scale.

It should be understood that the present disclosure is for the purpose of illustration only and that this invention includes all modifications and equivalents which fall within the scope of the appended claim.

I claim:

In combination, in a dial instrument having uniformly spaced graduations thereon and a pointer cooperable therewith, the outer portion of the pointer, including that part which sweeps across the dial graduations being very narrow and having rectilinear edges which are parallel, accented graduations associated with terminal portions of uniformly spaced dial graduations and cooperative with the pointer to show when the pointer lies within a predetermined permissive range of deviation, less than the distance between adjacent graduations, from that graduation with which a given accented graduation is associated, said accented graduations being carried by the dial and having lateral straight edges substantially coincident with radii of the dial and so located that the aforesaid edges of the pointer sweep across said straight edges of the accented graduations as the tip of the pointer moves along the dial graduations.

References Cited in the file of this patent

UNITED STATES PATENTS

| | | |
|---|---|---|
| D. 100,761 | Elkonin | Aug. 11, 1936 |
| 611,722 | Weston | Oct. 4, 1898 |
| 911,401 | Junghans | Feb. 2, 1909 |
| 1,753,043 | Butler | Apr. 1, 1930 |
| 2,433,165 | Simpson | Dec. 23, 1947 |

FOREIGN PATENTS

| | | |
|---|---|---|
| 233,945 | Great Britain | May 21, 1925 |